US009851997B2

United States Patent
Gough et al.

(10) Patent No.: US 9,851,997 B2
(45) Date of Patent: Dec. 26, 2017

(54) OPTIMIZING ORDER OF MIGRATING VIRTUAL COMPUTING INSTANCES FOR INCREASED CLOUD SERVICES ENGAGEMENT

(71) Applicant: VMware, Inc., Palo Alto, CA (US)

(72) Inventors: Michael Gough, San Jose, CA (US); Debashis Basak, San Jose, CA (US); Mark Whipple, Golden, CO (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/750,901

(22) Filed: Jun. 25, 2015

(65) Prior Publication Data
US 2016/0378524 A1  Dec. 29, 2016

(51) Int. Cl.
G06F 9/455 (2006.01)
H04L 29/08 (2006.01)

(52) U.S. Cl.
CPC .. *G06F 9/45558* (2013.01); *G06F 2009/4557* (2013.01); *H04L 67/1095* (2013.01)

(58) Field of Classification Search
None
See application file for complete search history.

(56) References Cited

U.S. PATENT DOCUMENTS

2013/0212578 A1\* 8/2013 Garg ............... H04L 43/0882
718/1
2015/0356773 A1\* 12/2015 Kumar ............ G06F 9/45558
345/520

OTHER PUBLICATIONS

Rastogi et al. "A Proposed Solution to Travelling Salesman Problem using Branch and Bound," Mar. 2013.\*

\* cited by examiner

*Primary Examiner* — Sisley Kim (57) ABSTRACT

The order of migrating virtual computing instances from a private data center to a public cloud is optimized using a TSP solver. The method of migrating a plurality of virtual computing instances that are in communication with each other within a private data center to a public cloud includes the steps of assigning, for each different pair of virtual computing instances, a numerical value that represents an amount of data transmission between the pair over a predetermined period of time, determining a recommended order of migration for the virtual computing instances based on the assigned numerical values, and migrating the virtual computing instances according to the recommended order.

16 Claims, 3 Drawing Sheets

| Migration Order | Interim cost after 1 VM is migrated | Interim cost after 2 VMs are migrated | Interim cost after 3 VMs are migrated | Total Cost |
|---|---|---|---|---|
| 1, 2, 3, 4 | 5+10+15 = 30 | (10+15)+(8+2) = 35 | 15+2+20 = 37 | 30+35+37 = 102 |
| 1, 2, 4, 3 | 5+10+15 = 30 | (10+15)+(8+2) = 35 | 10+8+20 = 38 | 30+35+38 = 103 |
| 1, 3, 2, 4 | 5+10+15 = 30 | (5+15)+(8+20) = 48 | 15+2+20 = 37 | 30+48+37 = 115 |
| 1, 3, 4, 2 | 5+10+15 = 30 | (5+15)+(8+20) = 48 | 5+8+2 = 15 | 30+48+15 = 93 |
| 1, 4, 2, 3 | 5+10+15 = 30 | (5+10)+(2+20) = 37 | 10+8+20 = 38 | 30+37+38 = 105 |
| 1, 4, 3, 2 | 5+10+15 = 30 | (5+10)+(2+20) = 37 | 5+8+2 = 15 | 30+37+15 = 82 |
| 2, 1, 3, 4 | 5+8+2 = 15 | (10+15)+(8+2) = 35 | 15+2+20 = 37 | 15+35+37 = 87 |
| 2, 1, 4, 3 | 5+8+2 = 15 | (10+15)+(8+2) = 35 | 10+8+20 = 38 | 15+35+38 = 88 |
| 2, 3, 1, 4 | 5+8+2 = 15 | (5+10)+(2+20) = 37 | 15+2+20 = 37 | 15+37+37 = 89 |
| 2, 3, 4, 1 | 5+8+2 = 15 | (5+10)+(2+20) = 37 | 5+10+15 = 30 | 15+37+30 = 82 |
| 2, 4, 1, 3 | 5+8+2 = 15 | (5+15)+(8+20) = 48 | 10+8+20 = 38 | 15+48+38 = 101 |
| 2, 4, 3, 1 | 5+8+2 = 15 | (5+15)+(8+20) = 48 | 5+10+15 = 30 | 15+48+30 = 93 |
| 3, 1, 2, 4 | 10+8+20 = 38 | (5+15)+(8+20) = 48 | 15+2+20 = 37 | 38+48+37 = 123 |
| 3, 1, 4, 2 | 10+8+20 = 38 | (5+15)+(8+20) = 48 | 5+8+2 = 15 | 38+48+15 = 101 |
| 3, 2, 1, 4 | 10+8+20 = 38 | (5+10)+(2+20) = 37 | 15+2+20 = 37 | 38+37+37 = 112 |
| 3, 2, 4, 1 | 10+8+20 = 38 | (5+10)+(2+20) = 37 | 5+10+15 = 30 | 38+37+30 = 105 |
| 3, 4, 1, 2 | 10+8+20 = 38 | (10+15)+(8+2) = 35 | 5+8+2 = 15 | 38+35+15 = 88 |
| 3, 4, 2, 1 | 10+8+20 = 38 | (10+15)+(8+2) = 35 | 5+10+15 = 30 | 38+35+30 = 103 |
| 4, 1, 2, 3 | 15+2+20 = 37 | (5+10)+(2+20) = 37 | 10+8+20 = 38 | 37+37+38 = 112 |
| 4, 1, 3, 2 | 15+2+20 = 37 | (5+10)+(2+20) = 37 | 5+8+2 = 15 | 37+37+15 = 89 |
| 4, 2, 1, 3 | 15+2+20 = 37 | (5+15)+(8+20) = 48 | 10+8+20 = 38 | 37+48+38 = 123 |
| 4, 2, 3, 1 | 15+2+20 = 37 | (5+15)+(8+20) = 48 | 5+10+15 = 30 | 37+48+30 = 115 |
| 4, 3, 1, 2 | 15+2+20 = 37 | (10+15)+(8+2) = 35 | 5+8+2 = 15 | 37+35+15 = 87 |
| 4, 3, 2, 1 | 15+2+20 = 37 | (10+15)+(8+2) = 35 | 5+10+15 = 30 | 37+35+30 = 102 |

OPTIMIZING ORDER OF MIGRATING VIRTUAL COMPUTING INSTANCES FOR INCREASED CLOUD SERVICES ENGAGEMENT

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual computing instances, which may be virtual machines (VMs) that contain a guest operating system (OS) or OS-less containers, and logical networks. However, the use of such public cloud services is typically kept separate from the use of existing computing resources in data centers managed by an enterprise.

When migrating large numbers of virtual computing instances from a private data center to a public cloud, large enterprises face challenges in predicting the performance of a system during migration. Since in most cases operations must be more or less uninterrupted during the migration, the unknown performance of the system during the migration is a source of risk to the on-going operation. In some cases, enterprises decide to delay or forgo the planned migration, electing instead to move some small portion of the group of virtual computing instances that is not central to the operation.

The nature of the problem is one of selecting a permutation that has good performance characteristics when applied as an ordering of virtual computing instances being migrated. Since the naive implementation operates in factorial time with respect to the number of virtual computing instances, it is not practical for large operations, as the solution would require many years to run to completion. Parallel computation also would yield only incremental improvement for vast expenditures of resources.

The N-factorial nature of the problem is shared by the well-known "Travelling Salesman Problem" (hereinafter, TSP), with important differences, however. In both cases, a fully connected graph is considered, and only select edges of that graph are traversed to form the solution. Unlike the TSP, the cost of traversing a graph edge of the migration problem is not constant. In general, it depends on the migration status of the whole set of virtual computing instances. Thus, each time a virtual computing instance is migrated, the costs associated with the various graph edges change. Given the large number of virtual computing instances that enterprises employ, the brute force combinatorial approach is of no use, and a migration solution using the TSP solver does not yet exist.

SUMMARY

Embodiments optimize the order of migrating virtual computing instances from a private data center to a public cloud using a TSP solver. In one embodiment, a method of migrating a plurality of virtual computing instances that are in communication with each other within a private data center to a public cloud includes the steps of assigning, for each different pair of virtual computing instances, a numerical value that represents an amount of data transmission between the pair over a predetermined period of time, determining a recommended order of migration for the virtual computing instances based on the assigned numerical values, and migrating the virtual computing instances according to the recommended order.

In the above method, the assigned numerical value may be weighted according to a number of transactions between the corresponding pair of virtual computing instances over the predetermined period of time, such that the assigned numerical value is higher for higher number of transactions and lower for lower number of transactions. In addition, the order of migration may be determined by comparing total costs of migration for different hypothetical orders of migration, wherein the total cost of migration for a hypothetical order of migration for the virtual computing instances is equal to a sum of first through N-th interim costs of migration, where first through N-th virtual computing instance are designated for migration first through N-th in time, respectively, and each n-th interim cost of migration ($1 \leq n < N$) is computed based on an assumption that first through n-th virtual computing instances have been migrated, as a sum of the numerical values assigned to each different pair of first through n-th virtual computing instances and (n+1)-th through N-th virtual computing instances.

Further embodiments include a computer system programmed to carry out the method set forth above and a non-transitory computer-readable storage medium storing instructions that, when executed by a computer system, cause the computer system to perform a method of determining a recommended order of migrating a plurality of virtual computing instances that are in communication with each other.

BRIEF DESCRIPTION OF THE DRAWINGS

FIG. 4 is a table that shows the total cost of migrating virtual machines according to different orders of migration virtual machines.

DETAILED DESCRIPTION

Figure 1:
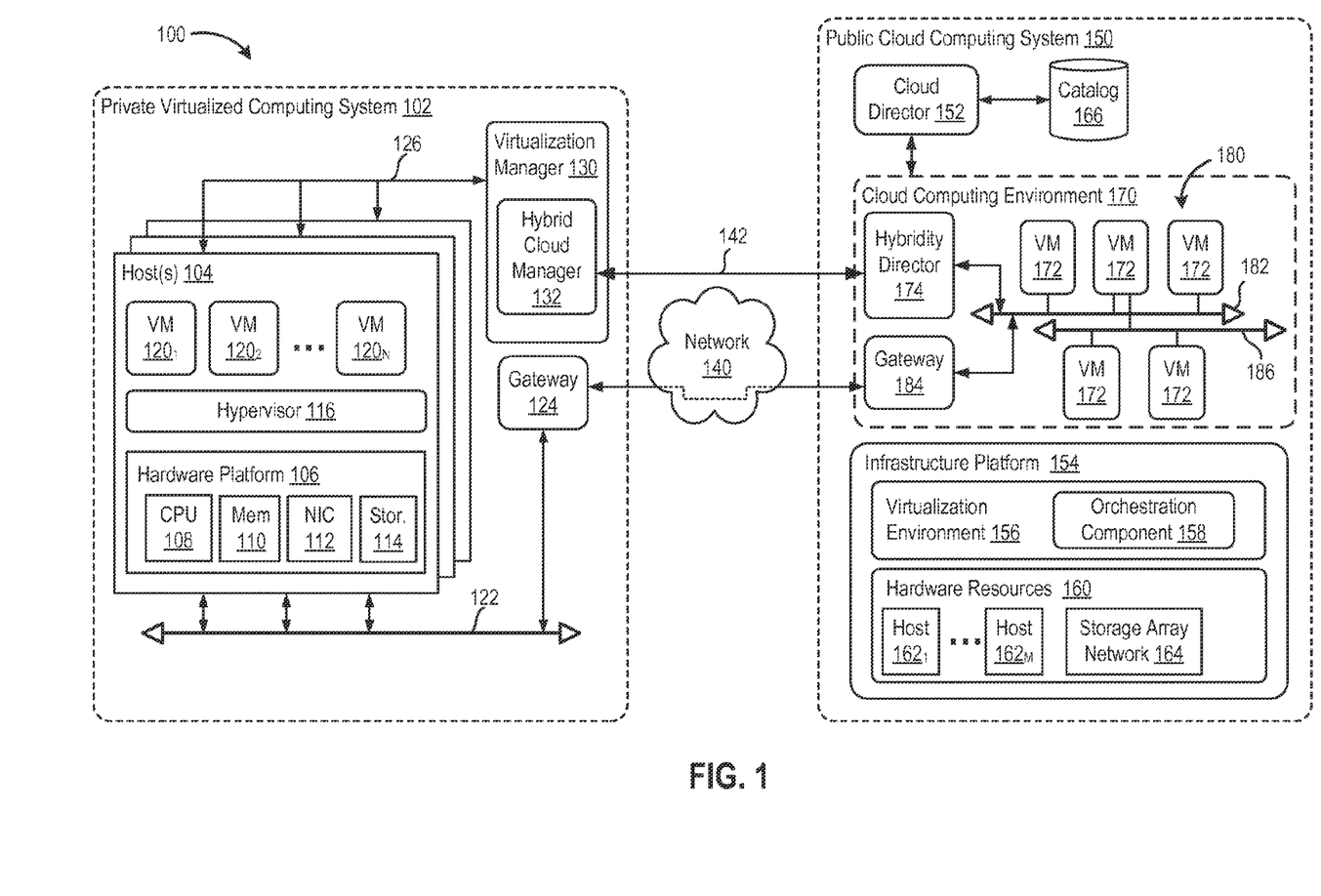
FIG. 1 is a block diagram of a virtualized computing system in which one or more embodiments of the present disclosure may be utilized.

FIG. 1 is a block diagram of a virtualized computing system 100 in which one or more embodiments of the present disclosure may be utilized. Virtualized computing system 100 includes a private virtualized computing center 102 and a public cloud computing system 150, and is configured to provide a common platform for managing and executing virtual workloads seamlessly between private virtualized computing center 102 and public cloud computing system 150. In one embodiment, private virtualized computing center 102 may be a data center controlled and administrated by a particular enterprise or business organization, while public cloud computing system 150 is operated by a cloud computing service provider and exposed as a service available to account holders, such as the particular enterprise in addition to other enterprises. As such, private virtualized computing center 102 may sometimes be referred to as an on-premise data center(s), and public cloud computing system 150 may be referred to as a "public" cloud service. In some embodiments, private virtualized computing center 102 itself may be configured as a private cloud service providing cloud services to various organizations within the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Private virtualized computing center 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within private virtualized computing center 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual computing instances that run concurrently on the same hosts, the virtual computing instances being implemented as virtual machines $120_1$ to $120_N$ (collectively referred to as VMs 120) in this embodiment. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Private virtualized computing center 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in private virtualized computing center 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by public cloud computing system 150 with virtualized computing resources of computing system 102 to form a unified "hybrid" computing platform. Hybrid cloud manager 132 is configured to deploy VMs in public cloud computing system 150, migrate VMs from private virtualized computing center 102 to public cloud computing system 150 according to techniques disclosed herein, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one or more embodiments, public cloud computing system 150 is configured to dynamically provide an enterprise (or users of an enterprise) with one or more virtual data centers 170 in which a user may provision VMs 120, deploy multi-tier applications on VMs 120, and/or execute workloads. Public cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of public cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of public cloud computing system 150). In other embodiments, cloud computing environment 170 may be configured as a multi-tenant cloud service with logically isolated virtualized computing resources on a shared physical infrastructure. It is recognized that public cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to private virtualized computing center 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, public cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within private virtualized computing center 102. In other embodiments, gateway 184 may be configured to connect to communicate with private virtualized computing center 102 using a high-throughput, dedicated link (depicted as a direct connect 142) between private virtualized computing center 102 and public cloud computing system 150. In one or more embodiments, gateways 124 and 184 are configured to provide a "stretched" layer-2 (L2) network that spans private virtualized computing center 102 and virtual data center 180, as shown in FIG. 1.

In one embodiment, each virtual data center 180 includes a "hybridity" director module (depicted as hybridity director 174) configured to communicate with the corresponding hybrid cloud manager 132 in private virtualized computing center 102 to enable a common virtualized computing platform between private virtualized computing center 102 and public cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142.

Figure 2:
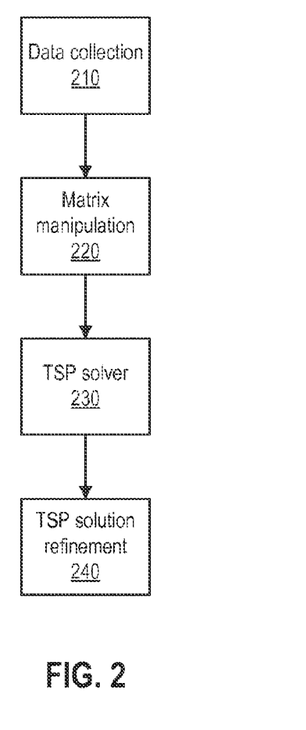
FIG. 2 depicts a flow diagram of method steps for determining an order of migrating virtual machines, according to an embodiment.

As briefly described above, hybrid cloud manager 132 manages the migration of VMs 120 from private virtualized computing system 102 to public cloud computing system 150. Prior to the migration, an order of migration is determined using an algorithm that may be implemented in hybrid cloud manager 132 or in an external server (e.g., a third party server equipped with a high-performance processor) that computes the order of migration in response to a request from hybrid cloud manager 132 and delivers the computed solution to hybrid cloud manager 132. In either case, the software component that implements the algorithm is referred to herein as "a migration order determining module," and the steps executed by this module are illustrated in FIG. 2. Step 210 is a data collection step. Step 220 is a matrix manipulation step. Step 230 is a TSP solving step. Step 240 is a TSP solution refinement step. Each of the steps is described in further detail below.

Data collection step 210. Before collecting data for a group of VMs that have been targeted for migration, a consistent metric is defined for the cost of communications over a wide area network (WAN), the Internet, or any network that is situated between private virtualized computing system 102 and public cloud computing system 150, between each of the VMs that have migrated and each of the VMs that have yet to migrate. There are two primary factors in determining the cost metric: latency and bandwidth for each pairwise combination of VMs. Embodiments employ a linear combination which would, for example, count transport packets to represent bandwidth cost over unit time, where the first packet of a given transaction would be multiplicatively weighted to represent the cost associated with the latency of said transaction. The particular weight associated with the transaction is configurable. As a result, for the same amount of data transmitted between two VMs, the cost metric would be higher for higher number of transactions and lower for lower number of transactions. In computing the latency and bandwidth, data and transaction flow in both directions is considered. Alternatively, data and transaction flow only in the direction that results in a higher cost metric is considered.

The latency and bandwidth data for determining the cost metric may be supplied from a network monitoring system. Alternatively, the data may be obtained by temporarily activating instrumentation within the VMs themselves for a designated period of time. This instrumentation feature could for example be deployed as part of VM tools. Such instrumentation would be designed to collect the needed data in a manner that is has a negligible impact on the performance of the VMs and the associated network. Finally, the data may be collected by an agent installed on hosts 104. If automatic monitoring tools are not available, the cost metric may be assigned manually by an administrator based on statistical data collected over a period of time.

Figure 3A:
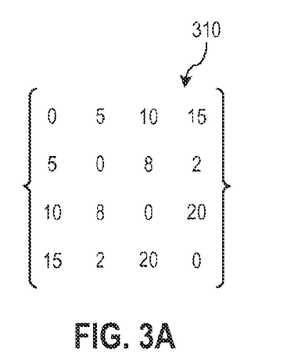
FIGS. 3A through 3E depict matrices that are derived during the method of determining an order of migrating virtual machines.

Matrix manipulation step 220. In order to calculate the order of migration using the TSP solver, the cost metrics derived based on the collected data are processed into a triangular cost matrix 310, such as the one shown in FIG. 3A. Each row and each column of matrix 310 correspond to one of the VMs being migrated. The cell value represents the cost metric for communications between the VM of the corresponding row and the VM of the corresponding column. In matrix 310, it is assumed that there are four VMs to be migrated and the cost metrics are as follows: VM1:VM2=5, VM1:VM3=10, VM1:VM4=15, VM2:VM3=8, VM2:VM4=2, VM3:VM4=20. It should be recognized that actual implementations are likely to have a larger number of VMs and, of course, different numbers for the cost metrics. Thus, in general, if there are N VMs, matrix 310 would be N×N. It should also be recognized that matrix 310 has zeroes along the diagonal, signifying that there is no cost associated with a VM communicating with itself.

Figure 3B:
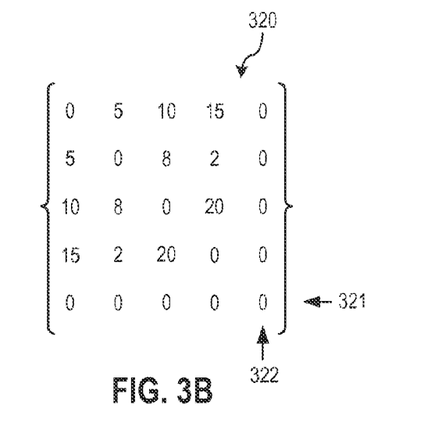

FIG. 3B shows a matrix 320 with an additional row 321 and an additional column 322 added. The migration order determining module adds this row and column to matrix 310 to represent a "fictitious" VM that corresponds to a VM that does not communicate with any other VMs. For this reason, all entries along the row and column of this fictitious VM are zeroes.

Figure 3C:
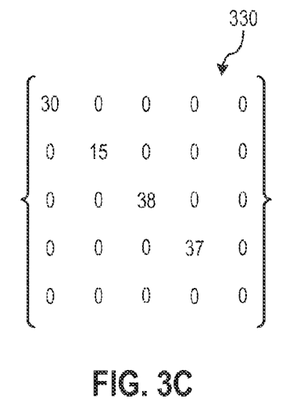

Then, the migration order determining module computes a sum of each row of matrix 320 and processes the computed sums into matrix 330, shown in FIG. 3C. The diagonals of matrix 330 contain the computed sums, such that the sum of the row 1 entries of matrix 320 occupies row 1, column 1 of matrix 330, the sum of the row 2 entries of matrix 320 occupies row 2, column 2 of matrix 330, etc. All non-diagonal entries of matrix 330 are zeroes.

Figure 3D:
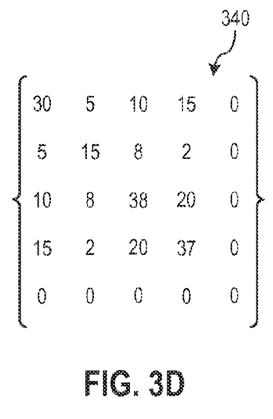
Figure 3E:
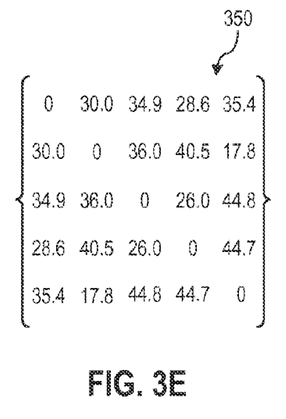

FIG. 3D shows a matrix 340 that is generated when the migration order determining module adds matrix 320 and matrix 330, and FIG. 3E shows a matrix 350 generated by the migration order determining module, where each cell value represents a Euclidean distance between Ti and Tj, where Ti represents an i-th row vector of matrix 340 and Tj represents a j-th row vector of matrix 340. The formula for measuring a Euclidean distance between two vectors, V and W, where each vector has M elements, is the square root of $[(V_1-W_1)^2+(V_2-W_2)^2+ \ldots +(V_M-W_M)^2]$.

TSP solving step 230. The migration order determining module includes a TSP solver algorithm or is linked with a TSP solver algorithm that is generally available in the art. One example of the TSP solver algorithm that may be used is the Concorde TSP Solver written by David Applegate, Robert E. Bixby, Vašek Chvátal, and William J. Cook. Another example is one written by George Dantzig, Ray Fulkerson, and Selmer M. Johnson. In either case, matrix 350 is input into the TSP solver algorithm with appropriate scaling of the values of matrix 350. For example, floating-point numbers may need to be converted into integers.

The output of the TSP solver algorithm is known as a Hamiltonian cycle. In general, the Hamiltonian cycle is a closed loop cycle through a graph of nodes that visits each node exactly once. As implemented in the embodiments, the Hamiltonian cycle is a closed loop cycle through a graph of VMs that are represented in matrix 350 and represents a hypothetical order of migrating the VMs. The fictitious VM represents the beginning and end point of the Hamiltonian cycle.

TSP solution refinement step 240. This step is carried out through a process of iterative refinement whereby the current best migration order is cut in two or more places and the segments are recombined in a new migration order. The new migration order is then evaluated to determine whether or not it is superior to its predecessor. If the new migration order is superior, it is adopted as the new best solution.

During the TSP solution refinement step, the old migration order and the new migration order are evaluated using a modified cost function to determine which is better, i.e., which one results in a lower communication cost. The modified cost function evaluates the total cost of migration as a sum of N−1 interim costs of migration, where N is the number of VMs being migrated and each n-th interim cost of migration ($1 \leq n < N$) is computed based on an assumption that first through n-th VMs have been migrated, as a sum of the cost metric assigned to each different pair of first through n-th VMs and (n+1)-th through N-th VMs.

In the example of the embodiment described herein where N=4 and the cost metrics are as follows: VM1:VM2=5, VM1:VM3=10, VM1:VM4=15, VM2:VM3=8, VM2:VM4=2, VM3:VM4=20, the total costs of migrating the VMs according to 24 different permutations are shown in FIG. 4. The migration orders that produce the lowest total cost are shown in boldface. They are: VM1-VM4-VM3-VM2 and VM2-VM3-VM4-VM1.

The migration order determining module delivers the migration order determined in accordance with the method illustrated above to hybrid cloud manager 132 as a recommended migration order. Then, hybrid cloud manager 132 carries out the migration of VMs from private virtualized computing system 102 to public cloud computing system 150 using migration techniques known in the art.

As a way to evaluate the accuracy of the migration order determined in accordance with the method according to embodiments illustrated above and highlight the how fast the solution was obtained relative to brute force combinatorial techniques, different migration scenarios, each having a different number of VMs, were solved using both the brute force combinatorial technique and the method according to the embodiments. The results are tabulated below. For ten (10) VMs, the total cost of migrating the VMs using the solution from the brute force combinatorial technique, representing the optimal solution, is 513, whereas it is 543 for the solution from the method according to the embodiments. Thus, the solution from the method according to the embodiments is slightly less than optimal, but the solution was obtained faster. The computational time gains become more significant as the number of VMs increase beyond ten. For eleven (11) VMs, computation time is reduced by a factor of about 12, and for twelve (12) and thirteen (13) VMs, by a factor of 200 and 2500, respectively. As is evident, the significant reductions in computational time were achieved by the method according to the embodiments with only small sacrifices in accuracy.

| Number of VMs | Run time for brute force combinatorial method (seconds) | Total cost for solution from combinatorial method | Run time for TSP method according to embodiments (seconds) | Total cost for solution from TSP method |
| --- | --- | --- | --- | --- |
| 10 | 5.16 | 513 | <5 | 543 |
| 11 | 58.87 | 704 | <5 | 774 |
| 12 | 809.64 | 874 | <5 | 923 |
| 13 | 12592.94 | 1326 | <5 | 1368 |

In all examples shown herein, the TSP solution refinement step 240 takes the solution produced by TSP and improves it by re-ordering the permutation selected by the TSP solver. The algorithm which is used within TSP to produce high-quality solutions (e.g., Lin-Kernighan algorithm), is modified such that it uses the migration cost as a metric for determining if a given alteration in the solution is desirable. Other iterative refinement methods mentioned in "Travelling Salesman Problem" can similarly be modified for this purpose. With such iterative refinement, optimal solutions are achieved for many matrices, and improved solutions are achieved for others.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of migrating a plurality of virtual computing instances that are in communication with each other, the method comprising:
   for each different pair of virtual computing instances, assigning a numerical value that represents an amount of data transmission between the pair over a predetermined period of time;
   determining a recommended order of migration for the virtual computing instances based on the assigned numerical values, wherein the recommended order of migration is determined by comparing total costs of migration for different hypothetical orders of migration, wherein a total cost of migration for a hypothetical order of migration for the virtual computing instances is equal to a sum of a plurality of interim costs of migration, wherein each interim cost of migration is computed based on an assumption that a corresponding number of virtual computing instances have been migrated, and as a sum of the numerical values assigned to a selected number of different pairs of virtual computing instances, wherein said determining includes:
      comparing a total cost of migration for a first hypothetical order of migration and a total cost of migration for a second hypothetical order of migration; and
      selecting one of the first and second hypothetical orders of migration as the recommended order; and
   migrating the virtual computing instances according to the recommended order.

2. The method of claim 1, wherein the assigned numerical value is weighted according to a number of transactions between the corresponding pair of virtual computing instances over the predetermined period of time, such that the assigned numerical value is higher for higher number of transactions and lower for lower number of transactions.

3. The method of claim 1, wherein the total cost of migration for the hypothetical order of migration for the virtual computing instances including first through N-th virtual computing instances (where the first through N-th virtual computing instance are designated for migration first through N-th in time, respectively) is equal to a sum of first through N-th interim costs of migration,
   wherein each n-th interim cost of migration ($1 \leq n < N$) is computed based on an assumption that first through n-th virtual computing instances have been migrated, and as a sum of the numerical values assigned to each different pair of first through n-th virtual computing instances and (n+1)-th through N-th virtual computing instances.

4. The method of claim 1, wherein said determining includes:
   building a matrix using the assigned numerical values that represent an amount of data transmission between different pairs of the virtual computing instances over the predetermined period of time; and
   inputting the matrix into an algorithm for solving a travelling salesman problem to produce a solution on which the recommended order is derived.

5. The method of claim 4, wherein said determining further includes:
   iteratively refining the solution by comparing different hypothetical orders of migration and selecting a best solution among the different hypothetical orders of migration as the recommended order.

6. The method of claim 1, wherein the virtual computing instances are each a virtual computing instance having an operating system.

7. The method of claim 1, wherein the virtual computing instances are each a virtual computing instance with no operating system.

8. A management server for a virtual computing system that includes a plurality of virtual computing instances that are in communication with each other, the management server comprising:
   a storage unit that stores a plurality of numerical values each representing an amount of data transmission between a different pair of the virtual computing instances over a predetermined period of time; and
   a processor programmed to determine a recommended order of migration for the virtual computing instances based on the assigned numerical values, wherein the recommended order of migration is determined by comparing total costs of migration for different hypothetical orders of migration, wherein a total cost of migration for a hypothetical order of migration for the virtual computing instances is equal to a sum of a plurality of interim costs of migration, wherein each interim cost of migration is computed based on an assumption that a corresponding number of virtual computing instances have been migrated, and as a sum of the numerical values assigned to a selected number of different pairs of virtual computing instances, wherein the processor determines the recommended order of migration by:
      comparing a total cost of migration for a first hypothetical order of migration and a total cost of migration for a second hypothetical order of migration; and
      selecting one of the first and second hypothetical orders of migration as the recommended order.

9. The management server of claim 8, wherein the assigned numerical value is weighted according to a number of transactions between the corresponding pair of virtual computing instances over the predetermined period of time, such that the assigned numerical value is higher for higher number of transactions and lower for lower number of transactions.

10. The management server of claim 8, wherein the total cost of migration for the hypothetical order of migration for the virtual computing instances including first through N-th virtual computing instances (where the first through N-th virtual computing instance are designated for migration first through N-th in time, respectively) is equal to a sum of first through N-th interim costs of migration,
    wherein each n-th interim cost of migration ($1 \leq n < N$) is computed based on an assumption that first through n-th virtual computing instances have been migrated, and as a sum of the numerical values assigned to each different pair of first through n-th virtual computing instances and (n+1)-th through N-th virtual computing instances.

11. The management server of claim 8, wherein the processor determines the recommended order of migration by:
   building a matrix using the assigned numerical values that represent an amount of data transmission between different pairs of the virtual computing instances over the predetermined period of time; and
   inputting the matrix into an algorithm for solving a travelling salesman problem to produce a solution on which the recommended order is derived.

12. The management server of claim 11, wherein the processor determines the recommended order of migration by:
   iteratively refining the solution by comparing different hypothetical orders of migration and selecting a best solution among the different hypothetical orders of migration as the recommended order.

13. The management server of claim 8, wherein the virtual computing instances are each a virtual computing instance having an operating system.

14. The management server of claim 8, wherein the virtual computing instances are each a virtual computing instance with no operating system.

15. A non-transitory computer readable medium comprising instructions that are executable in a computer system to carry out a method of determining a recommended order of migrating a plurality of virtual computing instances that are in communication with each other, the method comprising:
   building a matrix using numerical values each representing an amount of data transmission between a different pair of the virtual computing instances over a predetermined period of time;
   inputting the matrix into an algorithm for solving a travelling salesman problem to produce a solution; and
   iteratively refining the solution by comparing different hypothetical orders of migration and selecting a best solution among the different hypothetical orders of migration as the recommended order, wherein a total cost of migration for a hypothetical order of migration for the virtual computing instances is equal to a sum of a plurality of interim costs of migration, wherein each interim cost of migration is computed based on an assumption that a corresponding number of virtual computing instances have been migrated, and as a sum of the numerical values assigned to a selected number of different pairs of virtual computing instances, wherein said determining includes:
   comparing a total cost of migration for a first hypothetical order of migration and a total cost of migration for a second hypothetical order of migration; and
   selecting one of the first and second hypothetical orders of migration as the recommended order.

16. The non-transitory computer readable medium of claim 15, wherein the assigned numerical value is weighted according to a number of transactions between the corresponding pair of virtual computing instances over the predetermined period of time, such that the assigned numerical value is higher for higher number of transactions and lower for lower number of transactions.

* * * * *